(12) United States Patent
Hirashima

(10) Patent No.: US 6,711,104 B2
(45) Date of Patent: Mar. 23, 2004

(54) DISK READING APPARATUS

(75) Inventor: Minoru Hirashima, Osaka (JP)

(73) Assignee: Funai Electric Co., Ltd., Osaka (JP)

( * ) Notice: Subject to any disclaimer, the term of this patent is extended or adjusted under 35 U.S.C. 154(b) by 349 days.

(21) Appl. No.: 09/955,682

(22) Filed: Sep. 19, 2001

(65) Prior Publication Data

US 2002/0034134 A1 Mar. 21, 2002

(30) Foreign Application Priority Data

Sep. 19, 2000 (JP) ..................................... P2000-284025

(51) Int. Cl.7 ................................................ G11B 7/00
(52) U.S. Cl. ............................... 369/44.28; 369/44.32; 369/44.25
(58) Field of Search .......................... 369/44.28, 44.32, 369/44.25, 44.29, 44.34, 53.12, 53.13, 53.14, 53.18, 53.29, 53.34, 53.33, 53.35, 30.13, 30.14; 360/78.05

(56) References Cited

U.S. PATENT DOCUMENTS

| | | | | |
|---|---|---|---|---|
| 4,539,664 A | * | 9/1985 | Deguchi et al. ......... | 369/44.28 |
| 4,989,190 A | * | 1/1991 | Kuroe et al. ............ | 369/53.29 |
| 5,014,256 A | * | 5/1991 | Horie et al. ............ | 369/44.35 |
| 5,065,383 A | * | 11/1991 | Tateishi et al. ......... | 369/44.28 |
| 5,268,883 A | * | 12/1993 | Yamaguchi et al. ..... | 369/44.28 |
| 5,270,988 A | * | 12/1993 | Kobayashi ............. | 369/44.28 |
| 5,315,567 A | * | 5/1994 | Fuji et al. .............. | 369/44.26 |
| 6,445,650 B1 | * | 9/2002 | Tsai ...................... | 369/30.17 |

FOREIGN PATENT DOCUMENTS

| | | | |
|---|---|---|---|
| JP | 02054429 A | * | 2/1990 |
| JP | 4-95227 | | 3/1992 |
| JP | 04106727 A | * | 4/1992 |
| JP | 06349211 A | * | 12/1994 |

* cited by examiner

*Primary Examiner*—Thang V. Tran
(74) *Attorney, Agent, or Firm*—Rosenthal & Osha L.L.P.

(57) ABSTRACT

A disk reading apparatus includes a binarizing unit 5 for binarizing a tracking error signal 21 with a hysteresis width and for generating a track count signal 22, a jump unit 8 for causing track-jump on the basis of the track count signal 22, a malfunction detecting unit 9 for transmitting a malfunction signal 24 when level inversion occurs to the track count signal 22 while follow of the track is being implemented, and a control unit 15 for widening the hysteresis width when the pickup 1 is caused to follow the track, and for narrowing the hysteresis width when the pickup 1 is caused to track-jump.

2 Claims, 2 Drawing Sheets

DISK READING APPARATUS

BACKGROUND OF THE INVENTION

1. Field of the Invention

The present invention relates to a disk reading apparatus for detecting a signal recorded along tracks of a disk by using a pickup such as a CD-ROM drive or a DVD player, and more particularly to a disk reading apparatus for changing a hysteresis width of a binarizing means that binarizes a tracking error signal with the hysteresis width according to tracking operation or track-jump operation.

2. Description of the Related Art

A CD-ROM drive, a DVD player, and the like are designed so that, in the case where data intended for replay are recorded on a track being different from the track being followed by a pickup, track-jump can be implemented. On the other hand, it is necessary to count the number of jumped tracks when the track-jump is implemented. Owing to this, there is provided a binarizing means for binarizing a tracking error signal with a predetermined hysteresis width. Then, the number of the jumped tracks is counted by counting a pulse appearing in a track count signal being an output from the binarizing means.

Moreover, the above-mentioned binarizing means is designed so as to implement binarizing with the same hysteresis width as usual even during the tracking, and the generated track count signal is also used for judging whether or not a turbulence occurs in a tracking servo. That is to say, if there is a scratch on a recording surface of the disk, it becomes impossible to keep causing the pickup to follow the track, and there occurs a situation where a detecting position of the pickup misses the track. Moreover, if an external shock is given to the apparatus during the tracking, it becomes impossible for the pickup to follow the track due to the shock. Then, when such a situation occurs, a greater level-change occurs to the tracking error signal, and level inversion occurs to the track count signal. Owing to this, the CD-ROM drive is designed so as to, if the level inversion occurs to the track count signal while the data are being read, read the data on the same track once again. Moreover, the DVD player for picture images is designed so as to stop the replay of the data in the same situation (it is indicated as the first prior art).

Moreover, in the prior art proposed as Japanese Patent Application Laid-Open Publication No. HEI 4-95227, there is disclosed a structure wherein a level set circuit for fixing an output level of an amplification circuit by controlling a gain of the amplification circuit of the tracking error signal. Accordingly, in the case where this technique is used, even when an optical disk comprising two areas (a pre-format area and a memory area) with different levels of the tracking error signal is replayed, the tracking error signal with a fixed level can be gained in both of these two areas. Owing to this, the tracking can be implemented with a high precision in both of the pre-format area and the memory area. Moreover, even when the track-jump between the pre-format area and the memory area is implemented, the tracking error signal controlled so as to have the fixed level is given to a drive circuit for causing the pickup to track-jump (it is indicated as the second prior art).

However, using the first prior art has had problems described below. That is to say, due to an unevenness and the like in formation of the disk, there occurs a situation where the level of the tracking error signal is greater in one disk, and the level of the tracking error signal is smaller in other disk. Owing to this, in the case where the track-jump is implemented on the disk with a smaller level of the tracking error signal, there are the cases where the level of the tracking error signal does not exceed the hysteresis width. When such a situation occurs, the number of the jumped tracks is counted as less than the actual number, and the actual number of the jumped tracks becomes greater than the intended number of the tracks.

On the other hand, if the hysteresis width for implementing binarizing is narrowed-down, a track count signal is correctly generated when the pickup crosses the tracks even on the disk with the smaller level of the tracking error signal. However, in the case where the hysteresis width for binarizing is narrowed-down, there occur the problems described below.

That is to say, if the degree of a disturbance given to the apparatus is low or the scratch on the recording surface is minute, the pickup can follow the track without missing the track. However, a small level change occurs to the tracking error signal at this time. On the other hand, the binarizing means implements binarizing with the same hysteresis width as that during the track-jump even during the tracking. Accordingly, if the hysteresis width is narrowed-down, the binarizing means inverts the level of the track count signal even for the above-mentioned small level change. As a result, in the case of the CD-ROM drive, even when the disturbance is within a degree whereat the pickup can continue to follow the track, the data of the same track is read once again regarding that a turbulence occurs in the tracking servo. Owing to this, a time for reading the data becomes longer. Moreover, in the DVD player for picture images, even a small disturbance can stop the replay.

Moreover, although there is disclosed in the second prior art a structure wherein an output level of the amplification circuit is fixed by controlling the gain of the amplification circuit for amplifying the tracking error signal, nothing is mentioned concerning the track count signal. Owing to this, it is difficult to adopt this technique to the case of the apparatus for implementing control based on the track count signal.

SUMMARY OF THE INVENTION

The present invention is created in order to solve the above-mentioned problems, and an object thereof is to provide the disk reading apparatus that can prevent an error on counting the number of the jumped tracks from occurring even concerning the disk with the smaller level of the tracking error signal without causing the error on detecting the turbulence in the tracking servo by changing the hysteresis width for implementing binarizing for generating the track count signal according to whether the pickup is caused to follow the track on the basis of the tracking error signal or the track-jump is implemented.

In order to achieve the object, according to the present invention, there is provided a disk reading apparatus comprising a pickup for detecting data recorded along a track of a disk by using a light, a binarizing means for transmitting a track count signal resulting from binarizing a tracking error signal generated on the basis of an output from the pickup, with a hysteresis width, a servo means for causing the pickup to follow the track on the basis of the tracking error signal, a jump means for causing the pickup to track-jump to an intended track by counting the number of jumped tracks on the basis of the track count signal, and a malfunction detecting means for transmitting a malfunction signal that indicates a malfunction of tracking in the case where level inversion occurs to the track count signal while the servo means is causing the pickup to follow the track, and it comprises a control means for widening the hysteresis width when the servo means causes the pickup to follow to track, and for narrowing the hysteresis width when the jump means causes the pickup to track-jump.

That is to say, in the case of the disk with the smaller level of the tracking error signal, a width of the level change of the tracking error signal while the pickup is crossing the tracks is narrower. However, since the hysteresis width of the binarizing means is narrow at this time, a pulse appears in the track count signal every time the pickup crosses the tracks. Moreover, in the case of the disk with the greater level of the tracking error signal, even when there occurs the turbulence of the tracking within a range where the error on the data reading is not made, a level change with a proper width appears in the tracking error signal. However, the hysteresis width of the binarizing means becomes wide at this time so that the inversion of the level does not occur in the track count signal.

DETAILED DESCRIPTION OF THE PREFERRED EMBODIMENTS

Hereinafter, a preferred embodiment of the present invention will be explained with reference to the attached drawing.

Figure 1:
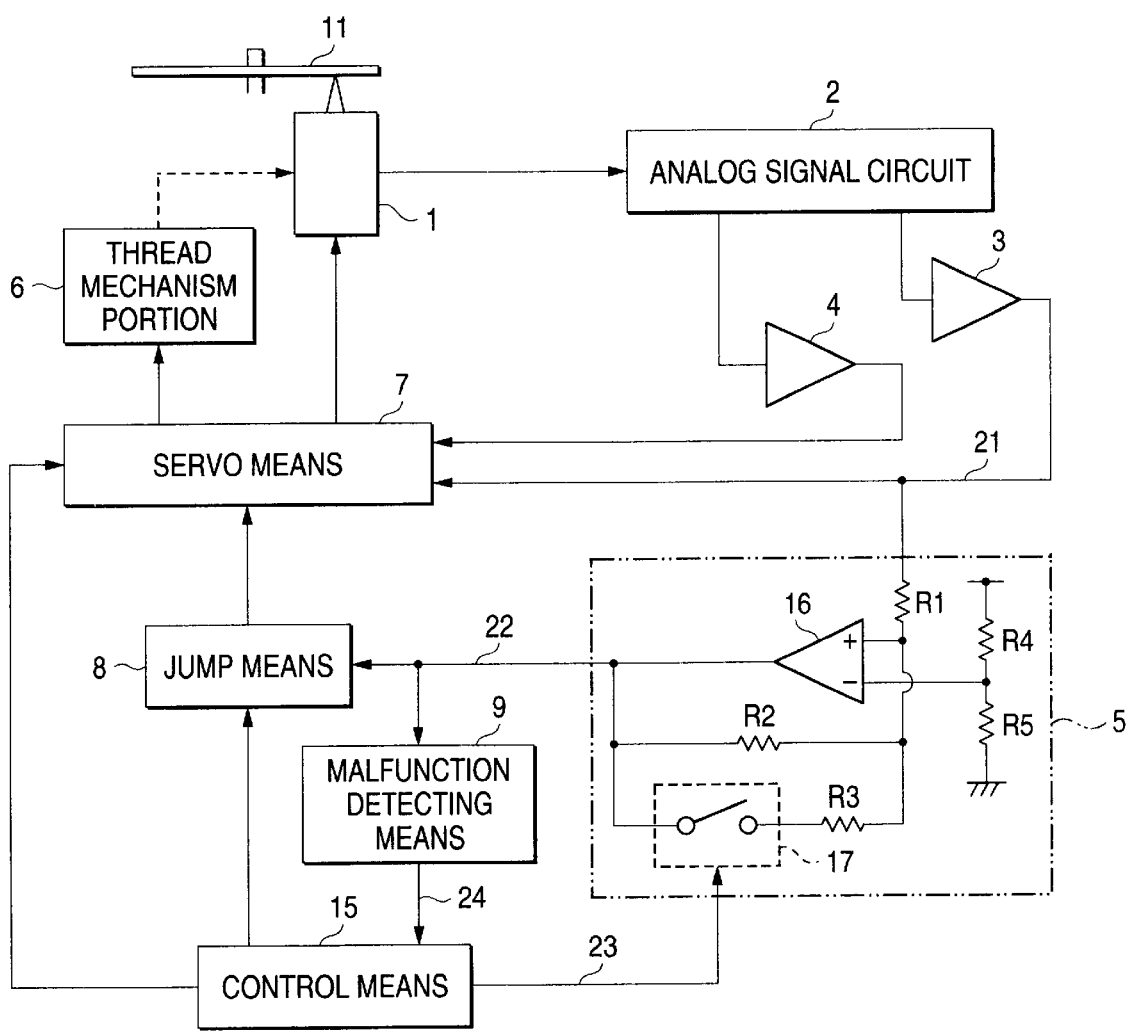
FIG. 1 is a block diagram showing an electric structure of an embodiment of a disk reading apparatus in the present invention.

FIG. 1 is a block diagram showing an electric structure of a disk reading apparatus according to an embodiment of the present invention.

In the figure, a disk 11 is an optical disk whereon data are recorded along a spiral-shaped track, and it is, for example, a CD for music, a CD-ROM, or a DVD. A pickup 1 is a block for reading the data recorded on the disk 11, and comprises an actuator for tracking and an actuator for focusing inside. A thread mechanism portion 6 is a block comprising a thread motor and the like, and moves the pickup 1 radially on the disk 11.

An analog signal circuit 2 is a block for generating a signal indicating the data, a focusing error signal, and a tacking error signal out of an output from the pickup 1. Then, the analog signal circuit 2 transmits the signal indicating the data to a digital signal processing circuit (it is not shown in figures). Moreover, the analog signal circuit 2 transmits the focusing error signal to a servo means 7 via an amplifier 4. Moreover, the analog signal circuit 2 transmits the tracking error signal to the servo means 7 via an amplifier 3.

The servo means 7 is hardware for causing a detection position of the pickup 1 to follow the track of the disk 11 on the basis of the focusing error signal amplified by the amplifier 4, and the tracking error signal 21 amplified by the amplifier 3. Owing to this, the servo means 7 drive-controls the two actuators provided in the pickup 1. Moreover, the servo means 7 controls operation of the thread mechanism portion 6.

The binarizing means 5 is a block for binarizing the tracking error signal 21 with the hysteresis width, and transmits the binarized signal to a jump means 8 and a malfunction detecting means 9 as the track count signal 22. Moreover, the hysteresis width for implementing binarizing can be changed into two sorts of widths. Owing to this, the binarizing means 5 comprises a comparator 16, five resistances R1 to R5, and a switch 17.

In detail, to a minus input of the comparator 16, a voltage parted by the resistances R4 and R5 is lead as a reference voltage for comparison. Moreover, to a plus input of the comparator 16, a tracking error signal 21 is lead via the resistance R1. Moreover, between the plus input and an output terminal of the comparator 16, the resistance R2 for giving a positive feedback is connected. Moreover, a circuit wherein the resistance R3 and the switch 17 are connected in serial is connected to the resistance R2 in parallel.

The binarizing means 5 has the above-mentioned structure. Owing to this, when the connection of the switch 17 is opened, the comparator 16 binaries the tracking error signal 21 with the hysteresis width determined according to a ratio between the resistance R2 and the resistance R1. Moreover, when the connection of the switch 17 is closed, the resistance R3 is connected to the resistance R2 in parallel. Owing to this, the comparator 16 binaries the tracking error signal 21 with the hysteresis width being wider than that of when the connection of the switch 17 is opened, since the ratio of the positive feedback becomes higher.

The jump means 8 is a block for causing the pickup 1 to jump to the intended track instructed by the control means 15, by counting the number of tracks over which the pickup 1 jumps on the basis of the track count signal 22. Owing to this, the jump means 8 moves the pickup 1 radially on the disk 11 by controlling the actuators of the pickup 1 or the thread mechanism portion 6 via the servo means 7. Moreover, while moving the pickup 1 radially on the disk 11, it counts the pulses appearing in the track count signal 22.

The malfunction detecting means 9 is a block for transmitting a malfunction signal 24 indicating a malfunction of the tracking in the case where the level inversion occurs in the track count signal 22 while the servo means 7 implements the control for causing the pickup 1 to follow the tracks of the disk 11.

The control means 15 is a block for controlling main operation as a disk reading apparatus. Owing to this, when it causes the servo means 7 to implement the control for causing the pickup 1 to follow the track of the disk 11, the hysteresis width for the case where the binarizing means 5 implements binarizing is widen by closing the connection of the switch 17. Moreover, when it causes the jump means 8 to implement the track-jump, the hysteresis width for the case where the binarizing means 5 implements binarizing is narrowed by opening the connection of the switch 17.

Moreover, when the malfunction signal 24 is transmitted from the malfunction detecting means 9 while the control means 15 is causing the servo means 7 to implement the control for causing the pickup 1 to follow the track of the disk 11 (while reading of the data from the disk 11 is being implemented), the control means 15 implements the control corresponding to the malfunction regarding the malfunction in the tracking occurs.

That is to say, in the case where the disk 11 is a medium such as the CD-ROM wherein an error on the data during reading is not allowed, the control means 15 implements again the control for reading the track whereon the malfunction occurs during the tracking when the malfunction signal 24 is transmitted. Moreover, in the case where the disk 11 is the DC for the music, the DVD for the picture images, and the like, the control means 15 implements the control for stopping the reading operation when the malfunction signal 24 is transmitted.

Figure 2:
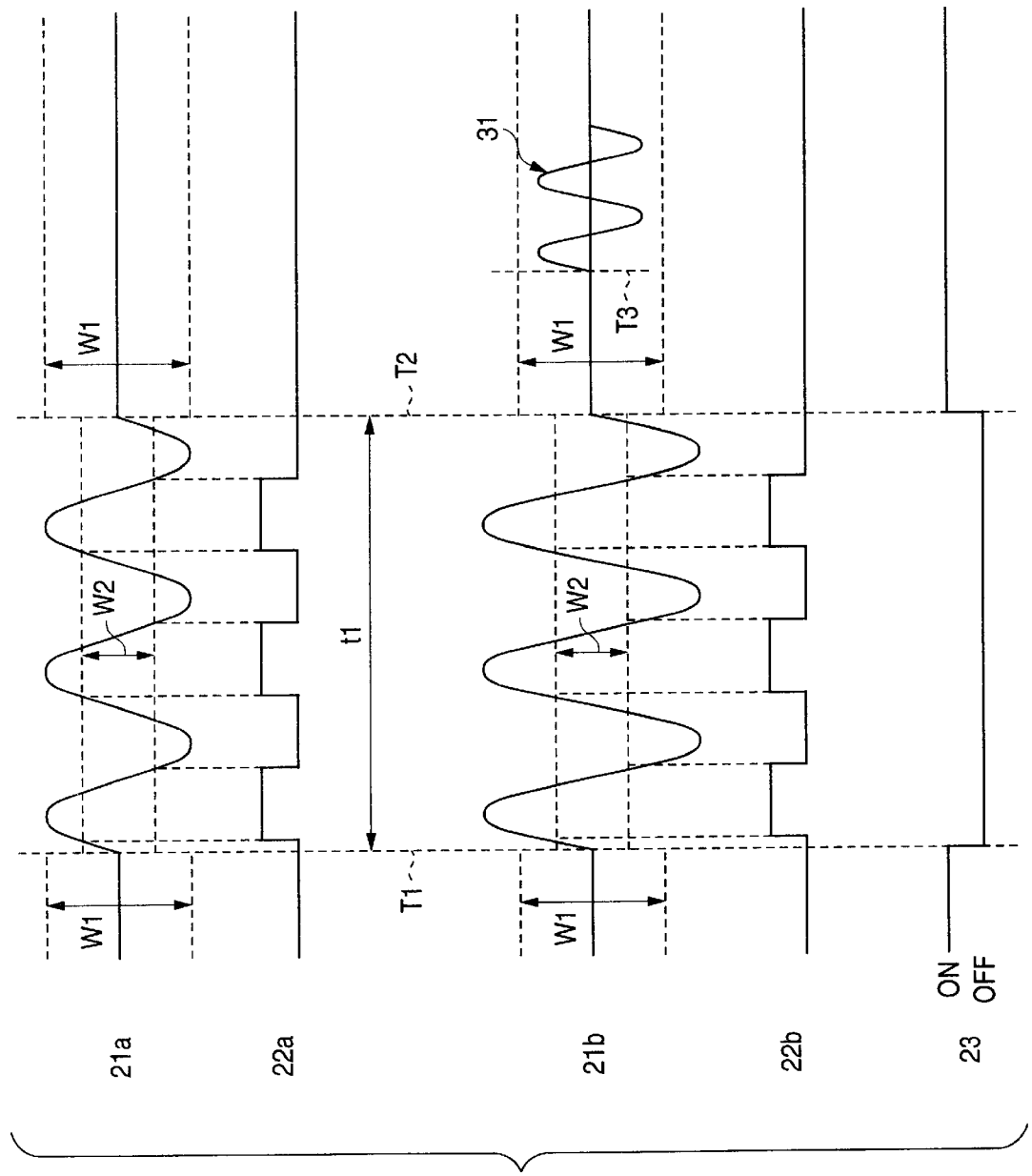
FIG. 2 is an explanatory drawing showing a main signal in the embodiment and changes of a hysteresis width.

FIG. 2 is an explanatory drawing showing main signals in the embodiment and changes of the hysteresis width. An explanation will be given of operation of the embodiment referring to the figure as need arises.

A term before a time T1 and a term after a time T2 in FIG. 2 indicate terms for reading the data from the disk 11. Moreover, a term t1 from the time T1 to the time T2 indicates the term for the track-jump. Moreover, a signal 21a indicates a wave shape of the tracking error signal of the case where the disk 11 is the disk with the smaller level of the tracking error signal, and a signal 21b indicates a wave shape of the tracking error signal of the case where the disk 11 is the disk with the greater level of the tracking error signal. Moreover, the hysteresis width W1 in this figure indicates the hysteresis width of the case where the connection of the switch 17 is closed, and the hysteresis width W2 indicates the hysteresis width of the case where the connection of the switch 17 is opened. Besides, although the number of the jumped tracks is three in order to simplify the figure, the number is several hundred to several thousand, or other numbers in an actual machine.

At first, an explanation will be given of the case where the disk 11 is the disk with the smaller level of the tracking error signal (the case where the tracking error signal is the signal indicated as the reference numeral 21a).

When the track-jump is started (at the time T1), the control means 15 stops tracking control in the servo means 7. Moreover, it changes the hysteresis width in the binarizing means 5 from W1 into W2 (it narrows the hysteresis width) by opening the connection of the switch 17. Moreover, the control means 15 gives the data indicating the intended track to the jump means 8, and starts the track-jump.

As a result of the above-mentioned control, the pickup 1 starts moving radially on the disk 11, and stars crossing the tracks. Owing to this, there occurs the level change of the number corresponding to the number of the tracks crossed by the pickup 1, in the tracking error signal 21a. On the other hand, the disk 11 at this time is the disk with the smaller level of the tracking error signal. Accordingly, the level change of the tracking error signal 21a that occurs while the pickup 1 is crossing the tracks becomes a narrow change. However, since the hysteresis width at this time is W2, which is narrow, the pulse appears in correspondence with the level change of the tracking error signal 21a in the track count signal 22a when the level change appears in the tracking error signal 21a.

The jump means 8 counts the number of the jumped tracks by counting the pulses appearing in the track count signal 22a. Then, when the counted result shows that the jump to the intended track is completed (at the time T2), the jump means 8 stops the control for the jump, and informs the control means 15 of the completion of the track-jump.

That is to say, concerning the track-jump, despite the fact that the disk 11 is the disk with the smaller level of the tracking error signal 21a, the pulse appears in the track count signal 22a every time the pickup 1 crosses the tracks. Accordingly, the detecting position of the pickup 1 at the time T2 whereat the track-jump is completed is the track instructed by the control means 15.

The control means 15 resumes the control of the tracking by the servo means 7 after being informed of the completion of the track-jump at the time T2. Moreover, it changes the hysteresis width in the binarizing means 5 from W2 into W1 by closing the connection of the switch 17. Owing to this, after the time T2, the pickup 1 obeys the control of the servo means 7 and follows the track of the disk 11. Moreover, the binarizing means 5 implements binarizing with the hysteresis width being W1.

Next, an explanation will be given of the case where the disk 11 is the disk with the greater level of the tracking error signal (the case where the tracking error signal becomes the signal 21b).

When the track-jump is started (at the time T1), the control means 15 stops tracking control in the servo means 7. Moreover, it changes the hysteresis width in the binarizing means 5 from W1 into W2 by opening the connection of the switch 17. Moreover, the control means 15 gives the data indicating the intended track to the jump means 8, and starts the track-jump.

As a result of the above-mentioned control, the pickup 1 starts moving radially on the disk 11, and stars crossing the tracks. Owing to this, there occurs the level change of the number corresponding to the number of the tracks crossed by the pickup 1, in the tracking error signal 21b. On the other hand, the disk 11 at this time is the disk with the greater level of the tracking error signal. Accordingly, the level change of the tracking error signal 21b that occurs while the pickup 1 is crossing the tracks becomes a wide change. Owing to this, the pulse appears in correspondence with the level change of the tracking error signal 21b in the track count signal 22b when the level change appears in the tracking error signal 21b.

The jump means 8 counts the number of the jumped tracks by counting the pulses appearing in the track count signal 22b. Then, when the counted result shows that the jump to the intended track is completed (at the time T2), the jump means 8 stops the control for the jump, and informs the control means 15 of the completion of the track-jump.

The control means 15 resumes the control of the tracking by the servo means 7 after being informed of the completion of the track-jump at the time T2. Moreover, it changes the hysteresis width in the binarizing means 5 from W2 into W1 by closing the connection of the switch 17. Owing to this, after the time T2, the pickup 1 obeys the control of the servo means 7 and follows the track of the disk 11. Moreover, the binarizing means 5 binarizes the tracking error signal 21b with the hysteresis width being W1.

It is assumed that under the state where the pickup 1 is controlled so as to follow the track of the disk 11 after the time T2, a shock is given to the apparatus at the time T3. Then, it is assumed that the turbulence of the tracking with a degree whereat the pickup 1 does not miss the track (the turbulence in a range wherein the error on the data reading does not occur) occurs to the pickup 1 due to the shock.

Owing to this turbulence, the level change occurs in the tracking error signal 21b (the change is indicated as a reference numeral 31). Moreover, since the turbulence of the tracking at this time is within a range wherein the error on the data reading does not occur, the width of the level change appearing in the tracking error signal 21b does not exceed the width W1. However, depending on the degree of the shock given to the apparatus, there are cases where the width of the level change exceeds the width W2. The reference numeral 31 indicates the level change occurring to the tracking error signal 21b in such a case.

On the other hand, the hysteresis width in the binarizing means 5 changes from W2 into W1 at the time T2. Owing to this, even when the level change indicated as the reference numeral 31 occurs to the tracking error signal 21b, the binarizing means 5 does not inverse the level of the track count signal 22b. Accordingly, the malfunction detecting means 9 does not transmit the malfunction signal 24 even when the level change indicated as the reference numeral 31 occurs to the tracking error signal 21b. As a result, the control means 15 continues the control for causing the pickup 1 to follow the track of the disk 11 by using the servo means 7.

That is to say, in the case where the disk 11 is the disk with the greater level of the tracking error signal, while the pickup 1 is following the track, even when the turbulence occurs to the follow, if the degree of the turbulence is within the range wherein the error on the data reading does not occur, the level inversion of the track count signal 22b is prevented from occurring. As a result, the malfunction signal 24 is prevented from being generated, and the control for continuing to read the data is implemented.

Besides, the present invention is not limited to the above-mentioned embodiment, and although an explanation has been given of the case where the binarizing means 5 has a structure with hardware, it may have a structure using software implemented by a micro-computer comprising an A/D converter leading the tracking error signal 21.

As explained above, a disk reading apparatus in the present invention comprises a binarizing means for transmitting a track count signal resulting from binarizing a tracking error signal generated on the basis of an output from a pickup, with a hysteresis width, a jump means for causing the pickup to track-jump to an intended track by counting the number of jumped tracks on the basis of the track count signal, and a malfunction detecting means for transmitting a malfunction signal that indicates a malfunction of the tracking in the case where level inversion occurs to the track count signal while the pickup is caused to follow the track, wherein there is comprised a control means for widening the hysteresis width when a servo means causes the pickup to follow the track, and for narrowing the hysteresis width when the jump means causes the pickup to track-jump. Accordingly, since the disk is the one with the smaller level of the tracking error signal, the hysteresis width is narrow even when a width of the level change of the tracking error signal while the pickup is crossing the tracks is narrower so that a pulse appears in the track count signal every time the pickup crosses the tracks. Moreover, since the disk is the one with the greater level of the tracking error signal, even when there occurs the turbulence within a range where the error on the data reading is not made and a level change with a proper width appears in the tracking error signal, the hysteresis width is wide so that the inversion of the level does not occur to the track count signal. Owing to this, without causing the error on detecting the turbulence in the tracking servo, occurrence of an error on counting the number of the jumped tracks can be prevented even concerning the disk with the smaller level of the tracking error signal.

What is claimed is:

1. A disk reading apparatus comprising:

a pickup that detects data recorded along tracks of a disk by using a light;

a tracking error signal generator that generates a tracking error signal on the basis of an output from said pickup;

a binarizor that binarizes the tracking error signal from said tracking error signal generator with a hysteresis width into a track count signal to transmit the track count signal;

a servo unit that causes said pickup to follow said tracks based on the tracking error signal;

a jump unit that causes said pickup to track-jump to an intended track by counting the number of jumped tracks on the basis of the track count signal;

a malfunction detector that transmits a malfunction signal indicative of a malfunction of tracking when level inversion occurs in the track count signal while said servo unit is causing said pickup to follow said tracks; and a controller that widens said hysteresis width when said servo unit causes said pickup to follow said tracks, and narrows said hysteresis width when the jump unit causes said pickup to jump over the tracks.

2. The disk reading apparatus as claimed in claim 1, wherein said binarizor has two changeable hysteresis widths.

* * * * *